United States Patent [19]
Kobayashi et al.

[11] Patent Number: 5,274,457
[45] Date of Patent: Dec. 28, 1993

[54] DIGITAL ELECTRONIC STILL CAMERA HAVING REMOVABLE RECORD MEANS

[75] Inventors: Toshiharu Kobayashi, Tokyo; Takumi Okaue, Kanagawa; Hirofumi Murase, Kanagawa; Hidehiko Okada, Kanagawa, all of Japan

[73] Assignee: Sony Corporation, Japan

[21] Appl. No.: 747,701

[22] Filed: Aug. 20, 1991

[30] Foreign Application Priority Data

Aug. 29, 1990 [JP] Japan ................................ 2-227471
Aug. 29, 1990 [JP] Japan ................................ 2-227472

[51] Int. Cl.$^5$ .............................................. H04N 5/30
[52] U.S. Cl. ..................................... 358/209; 358/906
[58] Field of Search ............... 358/909, 906, 209, 335; 354/412

[56] References Cited

U.S. PATENT DOCUMENTS

| | | | |
|---|---|---|---|
| 4,057,830 | 11/1977 | Adcock | 358/127 |
| 4,131,919 | 12/1978 | Lloyd et al. | 360/9 |
| 4,758,883 | 7/1988 | Kawahara et al. | 358/44 |
| 4,774,534 | 9/1988 | Kazumi et al. | 354/412 |
| 4,803,554 | 2/1989 | Pape | 358/209 |
| 4,914,746 | 4/1990 | Nishi et al. | 358/44 |
| 5,016,107 | 5/1991 | Sasson et al. | 358/209 |
| 5,060,069 | 10/1991 | Aoki | 358/209 |
| 5,065,246 | 11/1991 | Takemoto et al. | 358/209 |
| 5,067,029 | 11/1991 | Takahashi | 358/909 |
| 5,073,820 | 12/1991 | Nakagawa et al. | 358/209 |
| 5,091,787 | 2/1992 | Watanabe et al. | 358/909 |
| 5,130,813 | 7/1992 | Oie et al. | 358/909 |
| 5,132,807 | 7/1992 | Takimoto et al. | 358/906 |
| 5,146,353 | 9/1992 | Isoguchi et al. | 358/906 |

FOREIGN PATENT DOCUMENTS 0323194 7/1989 European Pat. Off.
0336317 10/1989 European Pat. Off.

OTHER PUBLICATIONS

Patent Abstracts of Japan, vol. 14, No. 340, Jul. 1990 Minolta Camera Co., May 2, 1990.
International Conference on Consumer Electronics, Jun. 9, 1989, Rosemont(US), pp. 184–185, F. Izawa et al., "Digital Still Video Camera Using Semiconductor Memory Card".

Primary Examiner—Michael T. Razavi
Assistant Examiner—Wendy R. Greening
Attorney, Agent, or Firm—Ronald P. Kananen

[57] ABSTRACT

A digital electronic still camera wherein additional information such as an operation characteristic of the camera can be recorded into and reproduced from a removable record medium. A pickup image signal is picked up by a CCD image sensor and converted into a digital signal by an analog to digital converter. The digital signal is temporarily stored into a digital memory and written onto a removable optical disk apparatus. The digital electronic still camera further comprises an additional information recording and reproducing circuit for recording and reproducing additional information such as an operation characteristic of the camera onto or from the optical disk apparatus.

7 Claims, 6 Drawing Sheets

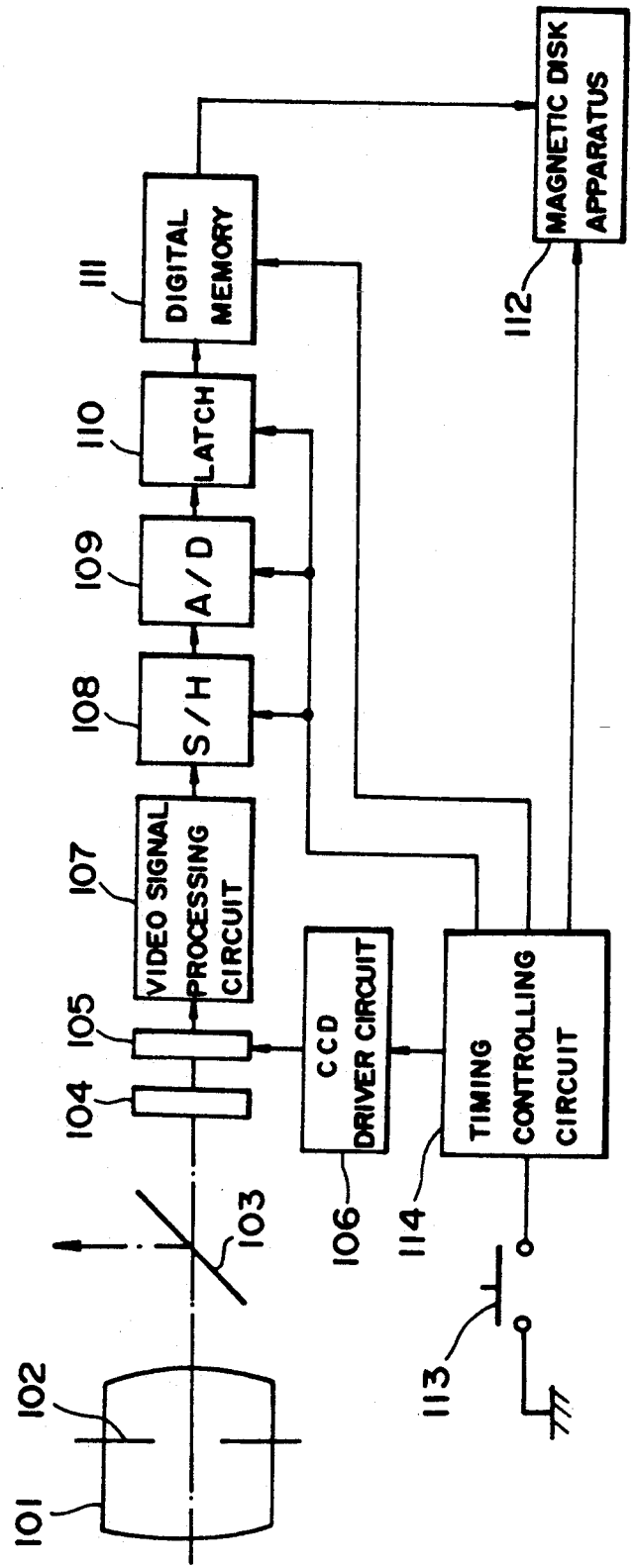

DIGITAL ELECTRONIC STILL CAMERA HAVING REMOVABLE RECORD MEANS

BACKGROUND OF THE INVENTION

1. Field of the Invention

This invention relates to a digital electronic still camera of the type wherein a still picture image picked up by a solid state image pickup element is recorded into a record medium.

2. Description of the Prior Art

A digital electronic still camera of the type wherein a pickup image signal outputted from a solid state image pickup element is converted into a digital signal and then recorded into a semiconductor memory or a magnetic disk or the like is conventionally known. An exemplary one of such conventional digital electric still cameras is disclosed, for example, in U.S. Pat. No. 4,131,919.

Referring to FIG. 6, there is shown an exemplary one of such conventional digital electronic still cameras. The digital electric still camera shown includes a lens 101, an aperture diaphragm 102, a half mirror 103 for introducing a picture image to a viewfinder (not shown) of the camera, an optical low-pass filter 104, a CCD (charge coupled device) image sensor 105, and a driver circuit 106 for driving the CCD image sensor 105. The digital electric still camera further includes a processing circuit 107 for performing video signal processing of a pickup image output signal produced from the CCD image sensor 105, a sample-and-hold circuit 108 for sampling and holding therein a pickup image output signal after video signal processing by the processing circuit 107, and an AD (analog to digital) converter 109 for converting a pickup image output signal obtained by sampling and holding by the sample-and-hold circuit 108 into a digital signal. The sample-and-hold circuit 108 and the AD converter 109 may be a general purpose unitary device on the market. The digital electronic still camera further includes a latch circuit 110 for latching therein picture image information in the form of digital signal received from the AD converter 109, and a digital memory 111 for storing therein picture image information latched in the latch circuit 110. The digital electronic still camera further includes a magnetic disk apparatus 112 for storing still picture information from the digital memory 111 onto a magnetic disk, a release switch 113 for starting a picking up operation of a still picture image by the CCD image sensor 105, and a timing controlling circuit 114 for controlling operation of the circuits 106 and 108 to 111 and the magnetic disk apparatus 112.

Such conventional digital electronic still camera is provided principally in order that a picture image picked up thereby may be displayed on a television receiver for domestic use, and the CCD image sensor 105 for use with such conventional digital electronic still camera involves 400 thousand picture elements or so to the utmost. Accordingly, a photograph taken with such conventional digital electronic still camera cannot bear comparison with a photograph taken otherwise with a conventional silver salt camera. Meanwhile, a magnetic record disk is only required to have a recording density corresponding to the density of picture elements of the CCD image sensor 105 or so, and besides, from the necessity to make a disk compact, the recording capacity of such disk is very limited.

Meanwhile, development of image pickup elements or improvement in recording density of record media in recent years is remarkable. Thus, elements having a performance which could not have been imagined at an initial stage of development of such conventional digital electronic still cameras have been developed.

However, since such conventional digital electronic still camera has a specification conforming to a television receiver for domestic use, even if a CCD image sensor for a high quality television camera of further high integration is developed, such CCD image sensor cannot be utilized for the conventional digital electronic still camera. Further, as a record medium, a writable optical disk has been developed in recent years, and the recording density has been raised remarkably with such writable optical disk. However, since the amount of information of a signal picked up by a CCD image sensor of a conventional digital electronic still camera is small, an optical disk is too great in recording capacity to use the same for such application.

Such problems arise from the fact that the specification is commonplace regardless of development of elements, and if the specification follows up such development of elements, then there is no problem. However, it is not possible to establish a plurality of specifications forecasting possible development of elements in advance, and it does not provide any merit to a user who has bought a product of a preceding specification to re-examine and revise a specification so as to assure the high order compatibility each time an element is developed.

SUMMARY OF THE INVENTION

It is an object of the present invention to provide a digital electronic still camera wherein additional information such as an operation characteristic of the camera can be recorded into and reproduced from a removable record medium.

In order to attain the object, according to one aspect of the present invention, there is provided a digital electronic still camera which comprises a solid state image pickup element for picking up an image of a subject to produce a pickup image signal, means for reading out the pickup image signal for one frame in a line sequential relationship from the solid state image pickup element, means for converting the thus read out pickup image signal successively into a digital signal, a digital memory for temporarily storing the digital signal therein, means for writing the digital signal into a removable record medium removably mounted on the digital electronic still camera and reading out such digital data from the record medium, and a recording and reproducing circuit for recording additional information such as an operation characteristic of the digital electronic still camera into the removable record medium and reproducing such additional information on the record medium.

With the digital electronic still camera, additional information such as an operation characteristic of the camera can be recorded onto and reproduced from a removable record medium by the recording and reproducing circuit. Accordingly, a condition of the digital electronic still camera in which it was used upon photographing can be specified in accordance with the additional information recorded in the record medium. Consequently, when the record medium is reproduced, reproduced information can be displayed as a correct picture image in accordance with such digital information as a picture element capacity, an aspect ratio and so forth which depend upon the density of elements of a CCD serving as the solid state image pickup element. Further, of whichever specification a CCD is developed, or even if the recording capacity of a record medium is increased remarkably, such CCD or record medium can be employed in the digital electronic still camera.

According to another aspect of the present invention, there is provided a digital electronic still camera which comprises a solid state image pickup element for picking up an image of a subject to produce a pickup image signal, means for reading out the pickup image signal for one frame in a line sequential relationship from the solid state image pickup element, means for converting the thus read out pickup image signal successively into a digital signal, a digital memory for temporarily storing the digital signal therein, means for writing the digital signal into or onto a removable record medium removably mounted on the digital electronic still camera and reading out such digital data from the record medium, and a compressing circuit for compressing data of the digital signal from the digital memory by block coding in synchronism with a reading operation of the reading out means. The digital memory may include first and second memories each having a storage capacity for a predetermined plurality of lines of the digital signal, and means for alternately selecting the first and second memories for each of the predetermined plurality of lines of the pickup image signal.

With the digital electronic still camera, data of the pickup image signal for one frame in a line sequential relationship from the solid state image pickup element are compressed by block coding by the compressing circuit in synchronism with a reading operation of the reading out means, and still picture image information after such data compression is recorded onto a removable record medium. Accordingly, a successive photographing operation can be performed as the first and second memories each having a storage capacity for a predetermined plurality of lines of the digital signal which constitute a processing unit for the block decoding by the compressing circuit are alternatively used.

The digital electronic still camera may further comprise memory changing over means for accepting, as the record medium, both of a semiconductor memory and an optical disk apparatus and controlling writing and reading out of the digital data and recording and reproduction of the additional information into and from the semiconductor memory and the optical disk apparatus such that the semiconductor memory may be used also as a buffer memory upon recording into the optical disk apparatus. Thus, the different record media can be selectively used. Accordingly, even if the recording density of a record medium is increased, such record medium can be employed suitably in the digital electronic still camera.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a similar view but showing a conventional digital electronic still camera.

DETAILED DESCRIPTION OF THE PREFERRED EMBODIMENTS

Figure 1:
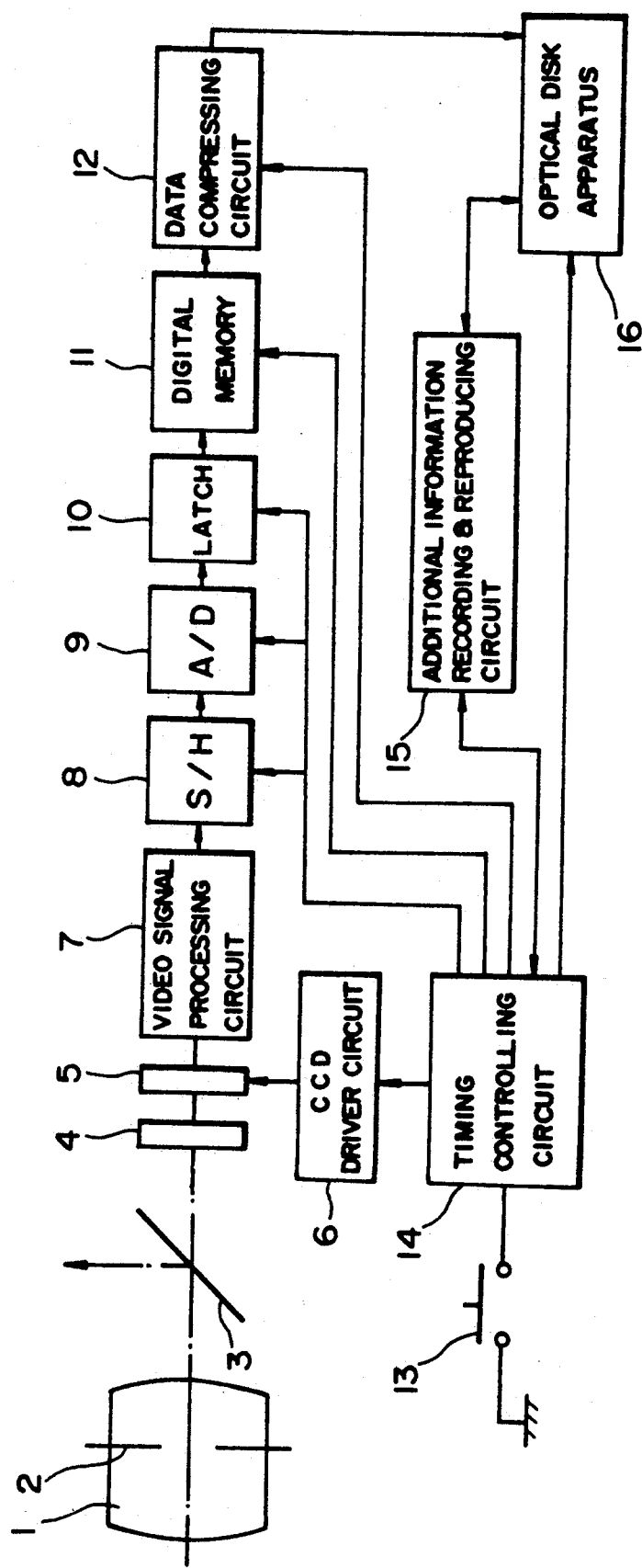
FIG. 1 is a block diagram of a digital electronic still camera showing a preferred embodiment of the present invention.

Referring first to FIG. 1, there is shown a digital electronic still camera of a first preferred embodiment of the present invention. The digital electric still camera includes a lens 1, an aperture diaphragm 2, a half mirror 3 for introducing a picture image to a viewfinder not shown of the camera, an optical low-pass filter 4, a CCD image sensor 5, and a driver circuit 6 for driving the CCD image sensor 5. The digital electric still camera further includes a processing circuit 7 for effecting video signal processing of a pickup image output signal produced from the CCD image sensor 5, a sample-and-hold circuit 8 for sampling and holding therein a pickup image output signal after video signal processing by the processing circuit 7, and an AD converter 9 for converting a pickup image output signal obtained by sampling and holding by the sample-and-hold circuit 8 into a digital signal. The sample-and-hold circuit 8 and the AD converter 9 may be a general purpose unitary device on the market. The digital electronic still camera further includes a latch circuit 10 for latching therein picture image information in the form of digital signal received from the AD converter 9, and a digital memory 11 for storing therein picture image information latched in the latch circuit 10. The digital electronic still camera further includes a compressing circuit 12 compressing, by block decoding or the like, data of still picture information received from the digital memory 11. The digital electronic still camera further includes a release switch 13 for starting a picking up operation of a still picture image by the CCD image sensor 5, and a timing controlling circuit 14 for controlling operation of the circuits 6 and 8 to 12 and an optical disk apparatus 16. The digital electronic still camera further includes an additional information recording and reproducing circuit 15.

The additional information recording and reproducing circuit 15 has additional information stored in a memory (not shown) such as a ROM (read only memory) therein. Before the digital electronic still camera is forwarded from a factory, additional information such as picture element information of the CCD image sensor 5 used, a conversion characteristic of the AD converter 9, presence or absence of a compressing method of digital picture image information, a gamma characteristic, a transfer speed of picture image information, presence or absence of audio information and a characteristic of an audio noise reducing circuit is written as digital information into the memory of the additional information recording and reproducing circuit 15.

The optical disk apparatus 16 is formed into a cassette together with a writing and reading circuit. Meanwhile, an optical disk itself is accommodated in a predetermined casing for the protection so as to facilitate exchanging thereof. The casing has a structure for the prevention of erasure in error and of writing in error. A well known technique of a magnetic disk of the 3.5 inch size or the like can be used for the casing.

It is to be noted that the digital electronic still camera may employ various information recording apparatus such as a magnetic disk apparatus, a memory card apparatus and an optical recording card apparatus in place of the optical disk apparatus 16.

The digital electronic still camera of such construction operates in the following manner.

When the optical disk apparatus 16 is mounted in position into the digital electronic still camera, the additional information recording and reproducing circuit 16 first operates to cause the optical disk apparatus 16 to reproduce medium information from the optical disk apparatus 16. Such medium information may be stored in advance in a ROM in the optical disk apparatus 16 or may be written in advance in a medium management area provided on an optical disk as hereinafter described. A recording speed, a record capacity and so forth of a record medium of the digital electronic still camera are set in accordance with such medium information reproduced from the optical disk apparatus 16. The information of such recording speed and so forth may be displayed on a body of the digital electronic still camera using a well known liquid crystal display panel or the like or else may be displayed, where the digital electronic still camera employs an electronic viewfinder, in the electronic viewfinder.

In the meantime, additional information is forwarded from the additional information recording and reproducing circuit 15 to the optical disk apparatus 16. In accordance with such additional information, a writing speed, a writing method and so forth are set by the optical disk apparatus 16. Simultaneously, the additional information is written onto an optical disk in accordance with such a format as illustrated in FIG. 2.

Figure 2:
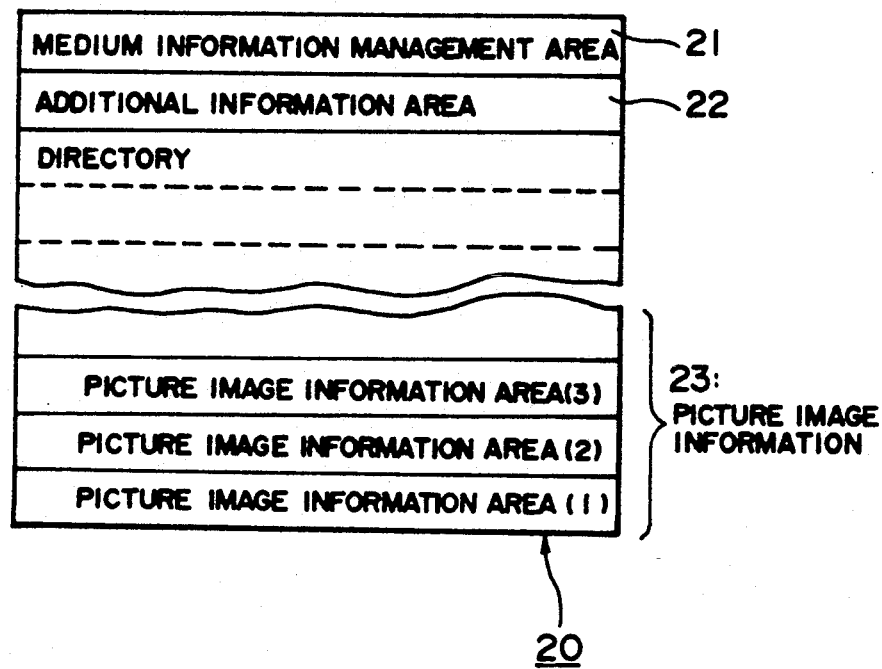
FIG. 2 is a recording format of a record medium for use with the digital electronic still camera shown in FIG. 1.

Referring to FIG. 2, the optical disk has a medium information management area 21 provided in the neighborhood of the center thereof and having information of a recording density and so forth of the medium itself recorded in a fixed length therein. The optical disk further has an additional information area 22 provided contiguously to the medium information management area 21 and having such additional information as described above recorded in a fixed length therein. Directory information or the like for permitting high speed retrieval or the like of a picture image may be additionally recorded in the additional information area 22. The remaining area of the optical disk all serves as a picture image area 23 for storing picture image information therein. In this instance, picture image information is recorded onto the optical disk beginning with a peripheral portion of the optical disk (lower side in FIG. 2) so as to permit recording until such recording point comes to the additional information area 22, which eliminates the necessity of assurance of a redundant area.

Subsequently, photographing with the digital electronic still camera will be described.

When the release switch 13 is operated, image pickup charge accumulated in the CCD image sensor 5 is processed at the timing for predetermined color balancing or the like and is written into the digital memory 11 by way of the sample-and-hold circuit 8, AD converter 9 and latch circuit 10. In particular, an image pickup signal is stored into the digital memory 11 for a predetermined interval of time until the optical disk reaches a predetermined recording speed.

In the meantime, the optical disk apparatus 16 makes preparations for a recording operation.

After the optical disk apparatus 16 is enabled to record, picture image information of the digital memory 11 is written in a variable length into the picture image information area 23 of the optical disk apparatus 16 by way of the compressing circuit 12. After such recording of the picture image information is completed, additional information such as directory information is recorded subsequently into the additional information area 22.

It is to be noted that, while such digital memory conventionally has a capacity for one picture image or so, the present digital electronic still camera employs a digital memory having a capacity for a plurality of picture images as the digital memory 11 in order to permit successive photographing.

Here, according to a standard television system such as the NTSC system or the PAL system, since a single picture image (one frame) is completed with an odd-numbered field and an even-numbered field due to interlaced scanning of horizontal lines, digital picture image processing is performed using a frame memory. Thus, where successive picture image processing is to be performed, two frame memories are required.

Figure 3:
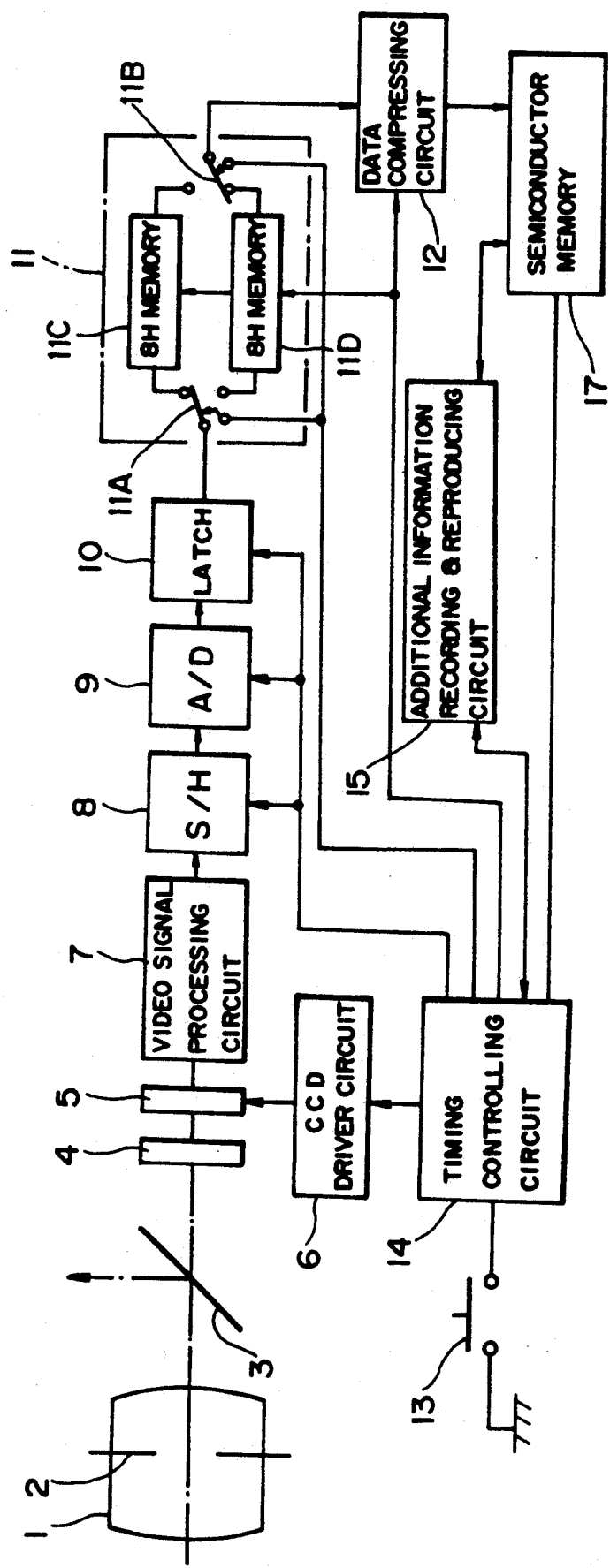
FIG. 3 is a block diagram of another digital electronic still camera showing a second preferred embodiment of the present invention.

Referring now to FIG. 3, there is shown another digital electronic still camera to which the present invention is applied. The digital electronic still camera of the second embodiment has somewhat common construction to the digital electronic still camera of the first embodiment described above but is constituted such that the compressing circuit 12 performs data compression by block coding for a unit of picture image information of 64 picture elements of 8×8 for still picture image information received from the CCD image sensor 5 and writes still picture image information after data compression into a semiconductor memory 17.

The CCD image sensor 5 employed here is constructed such that picture image information of all horizontal lines is read out in a line sequential relationship therefrom without performing interlaced scanning of horizontal lines. The CCD image sensor 5 is thus driven by the CCD driver circuit 6 so that picture image information of all horizontal lines is read out in a line sequential relationship for a period of one frame.

Meanwhile, the digital memory 11 is composed of first and second memories 11C and 11C for which an input changing over switch 11A and an output changing over switch 11B are provided.

Each of the first and second memories 11C and 11D has a storage capacity sufficient to store picture image information for 8 horizontal lines therein.

The input changing over switch 11A is controlled by the timing controlling circuit 14 to effect a changing over operation in synchronism with an image picking up operation by the CCD image sensor 5 so that the first and second memories 11C and 11D are alternately selected for a cycle of 8 horizontal scanning periods (8 H). Consequently, picture image information latched by the latch circuit 10 is written alternately into the first and second memories 11C and 11D for each 8 lines.

On the other hand, the output changing over switch 11B is controlled by the timing controlling circuit 14 to effect a changing over operation in synchronism with an image picking up operation by the CCD image sensor 5 so that the first and second memories 11C and 11D are selected alternately but reversely to the changing over operation of the input changing over switch 11B for each cycle of 8 horizontal scanning periods (8 H). Consequently, picture image information stored in the first and second memories 11C and 11D is read out alternately for each 8 lines.

The compressing circuit 12 performs data compression by block coding for a unit of picture image information of 64 picture elements of 8×8 for still picture image information read out for 8 lines from the digital memory 11. The compressing circuit 12 is controlled by the timing controlling circuit 14 to perform data compression in a synchronized relationship with an image picking up operation by the CCD sensor 5 and write still picture image information after data compression into the semiconductor memory 17.

Several circuits including the sample-and-hold circuit 8 to which a pickup image output signal developed from the CCD sensor 5 is supplied by way of the processing circuit 7, the AD converter 9 for converting a picture image output signal sampled and held by the sample-and-hold circuit 8 into a digital signal, the latch circuit 10 for latching therein digital picture image information received from the AD converter 9 and the digital memory 11 for storing therein picture image information from the latch circuit 10 are controlled by the timing controlling circuit 14 and operate in a synchronized relationship with an image picking up operation by the CCD image sensor 5 together with the compressing circuit 12.

In the digital electronic still camera of the second embodiment, data compression by block decoding can be performed for a unit of picture image information of 64 picture images of 8×8 by the compressing circuit 12 in synchronism with an image picking up operation of reading out picture image information for one frame in a line sequential relationship from the CCD image sensor 5.

The digital memory 11, which supplies picture image information of 64 picture elements of 8×8 to the compressing circuit 12, is constructed such that the first and second memories 11C and 11D each having a storage capacity for 8 horizontal lines are alternately changed over and used without the necessity of a frame memory.

Figure 4:
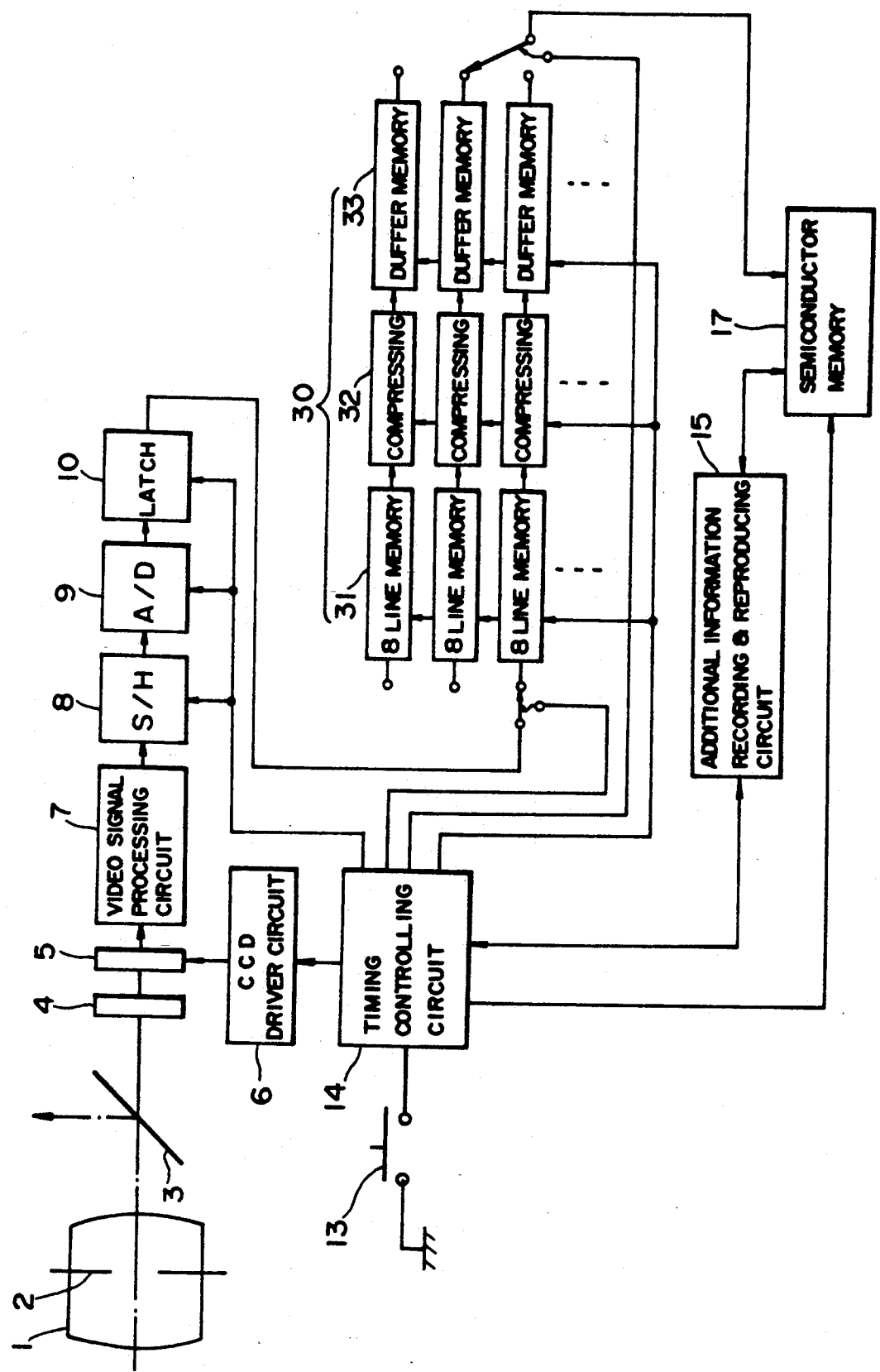
FIG. 4 is a similar view but showing a modification to the digital electronic still camera shown in FIG. 3.

It is to be noted that, when it is desired to raise the speed in successive photographing or raise the speed in reading from the CCD sensor 5, such construction as shown in FIG. 4 may be employed wherein a cascade connection circuit 30 is provided and includes 8 line memories 31, compressing circuits 32 and buffer memories 33 connected in a juxtaposed relationship. In the modified digital electronic still camera shown in FIG. 4, such cascade connection circuit 30 is changed over by an input changing over switch 34 and an output changing over switch 35.

Figure 5:
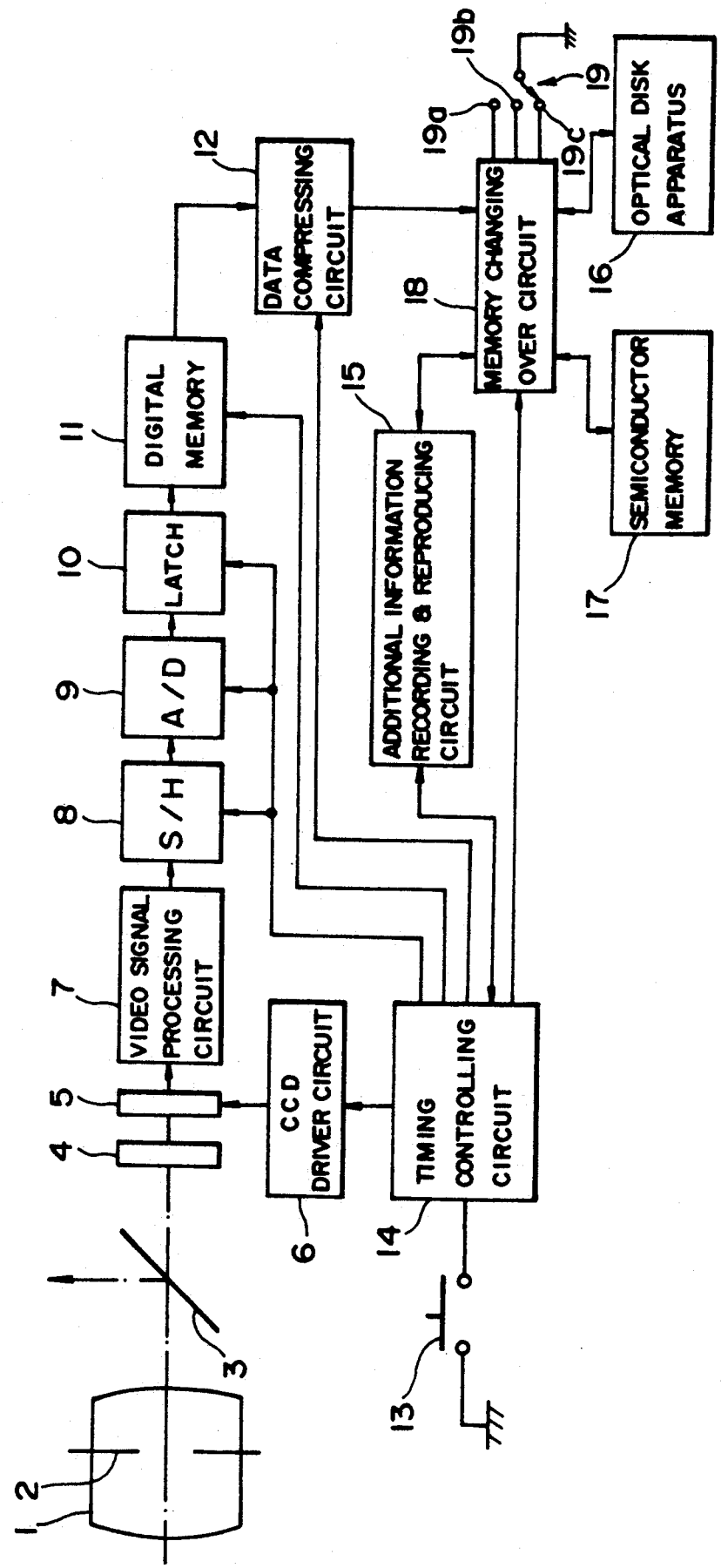
FIG. 5 is a similar view but showing a third preferred embodiment of the present invention.

Referring now to FIG. 5, there is shown a further digital electronic still camera to which the present invention is applied. The digital electronic still camera shown in FIG. 5 is a modification to the digital electronic still camera of the first embodiment described hereinabove with reference to FIG. 1 in that a semiconductor memory 17 can be used, in addition to the optical disk apparatus 16, as a record medium into which still picture image information for which data compression has been performed by the compressing circuit 12 is to be written.

The digital electronic still camera additionally includes a memory changing over circuit 18. The memory changing over circuit 18 detects that the removable optical disk 16 and/or the semiconductor memory 17 are mounted or removed so that, when the digital electronic still camera is used, such record media may be used appropriately in accordance with a choice of a user or in response to a condition of use of the digital electronic still camera.

The digital electronic still camera further includes a mode selecting switch 19. The mode selecting switch 19 is provided to permit a user to select a mode of use of a record medium at an appropriate time in response to a condition of use of the digital electronic still camera.

The digital electronic still camera operates in the following manner.

1. First Mode Using Semiconductor Memory

When a user operates the mode selecting switch 19 to select a terminal 19a of the latter, or when the memory changing over circuit 18 detects that only the semiconductor memory 17 is connected as a record medium thereto, the semiconductor memory 17 is selected as an available medium.

In the present mode, still picture image information picked up by the CCD sensor 5 is first stored into the digital memory 11 and then transferred immediately to the semiconductor memory 17. Accordingly, the present mode is used when it is necessary to record many picture images for a short period of time such as upon continuous photographing.

2. Second Mode Using Optical Disk

When a user operates the mode selecting circuit 19 to select another terminal 19b, or when the memory changing over circuit 18 detects that only the optical disk 16 is connected as a record medium thereto, only the optical disk 16 is selected as an available record medium.

In the present mode, still picture image information picked up by the CCD image sensor 5 is first stored into the digital memory 11 and then transferred immediately to the optical disk 16. Accordingly, when the digital electronic still camera is in a condition of normal use, the present mode is used most commonly.

3. Third Mode Using Both of Semiconductor Memory and Optical Disk

When a user operates the mode selecting circuit 19 to select a further terminal 19c, or when the memory changing over circuit 18 detects that both of the optical disk 16 and the semiconductor memory 17 are connected as record media thereto, the optical disk 16 and the semiconductor memory 17 are both selected as available record media.

In the present mode, still picture information picked up by the CCD image sensor 5 is stored once into the digital memory 11 and then stored into the semiconductor memory 17. In particular, the semiconductor memory 17 is used as a buffer memory, and after then, a user will reproduce still picture image information of the semiconductor memory 17 and select a picture image the user wants to store. Then, such picture image is transferred and recorded onto the optical disk apparatus 16. Such selection is possible, for example, by displaying a reproduced still picture of the semiconductor memory 17 in a viewfinder of the digital electronic still camera.

Having now fully described the invention, it will be apparent to one of ordinary skill in the art that many changes and modifications can be made thereto without departing from the spirit and scope of the invention as set forth herein.

What is claimed is:

1. A digital electronic still camera comprising a solid state image pickup element for picking up an image of a subject to produce a pickup image signal, means for reading out the pickup image signal for one frame in a line sequential relationship from said solid state image pickup element, means for converting the thus read out pickup image signal successively into a digital signal, a digital memory for temporarily storing the digital signal therein, means for writing the digital signal into a removable record medium having a reading and writing circuit, said record medium being removably mounted on said digital electronic still camera, and reading out such digital data from the record medium, and a recording and reproducing circuit for recording additional information such as an operation characteristic of said digital electronic still camera into the removable record medium and reproducing such additional information on the record medium, wherein said digital memory includes a plurality of memories each for storing the digital signal therein, a plurality of compressing circuits each for compressing the digital signal from the corresponding memory and a plurality of buffer memories each for temporarily storing therein the compressed digital data from the corresponding compressing circuit, and means for selectively coupling said plurality of memories to said converting means and the removable record medium.

2. A digital electronic still camera as set forth in claim 1, wherein said memories are line memories, each for storing the digital signal for a plurality of lines therein, said compressing circuits each compressing the digital signal from the corresponding line memory.

3. A digital electronic still camera as set forth in claim 2, wherein said plurality of line memories are in a cascade connection.

4. A digital electronic still camera, comprising a solid state image pickup element for picking up an image of a subject to produce a pickup image signal, means for reading out the pickup image signal for one frame in a line sequential relationship from said solid state image pickup element, means for converting the thus read out pickup image signal successively into a digital signal, a digital memory for temporarily storing the digital signal therein, means for writing the digital signal into or onto a removable record medium having a reading and writing circuit, said record medium being removably mounted on said digital electronic still camera and reading out such digital data from the record medium, and a compressing circuit for compressing data of the digital signal from said digital memory by block coding in synchronism with a reading operation of said reading out means, wherein said digital memory includes first and second memories each having a storage capacity for a predetermined plurality of lines of the digital signal, and means for alternately selecting said first and second memories for each of the predetermined plurality of lines of the pickup image signal.

5. A digital electronic still camera according to claim 4, further comprising a recording and reproducing circuit for recording additional information such as an operation characteristic of said digital electronic still camera into the removable record medium and reproducing such additional information from the record medium.

6. A digital electronic still camera according to claim 4, wherein the record medium is a semiconductor memory into which video data to which data compression has been performed by said compressing circuit are written.

7. A digital electronic still camera according to claim 1 or 4 further comprising memory changing over means for accepting, as the record medium, both of a semiconductor memory and an optical disk apparatus and controlling writing and reading out of the digital data and recording and reproduction of the additional information into and from the semiconductor memory and the optical disk apparatus such that the semiconductor memory may be used also as a buffer memory upon recording into the optical disk apparatus.

* * * * *